United States Patent [19]

Lyon

[11] Patent Number: 4,807,394

[45] Date of Patent: Feb. 28, 1989

[54] COMBINED PLATFORM AND CAPILLARY MAT FOR PLANT TENDER DEVICE AND METHOD OF MANUFACTURE

[75] Inventor: William Lyon, Hicksville, N.Y.

[73] Assignee: Plant-Tech, Inc, Mineola, N.Y.

[21] Appl. No.: 870,642

[22] Filed: May 29, 1986

Related U.S. Application Data

[63] Continuation of Ser. No. 693,100, Jan. 22, 1985.

[51] Int. Cl.⁴ ............................................. A01G 25/16
[52] U.S. Cl. ............................................. 47/79; 47/80
[58] Field of Search .................... 47/80, 81, 39, 18, 79, 47/59; 428/178; 524/585

[56] References Cited

U.S. PATENT DOCUMENTS

| | | | |
|---|---|---|---|
| 1,342,786 | 6/1920 | White | 47/81 |
| 2,157,340 | 5/1939 | Jones | 47/81 |
| 4,207,220 | 6/1980 | Godfrey | 524/585 |
| 4,211,036 | 7/1980 | Palitz | 47/79 |
| 4,276,720 | 7/1981 | Lyon | 47/81 |
| 4,344,536 | 8/1982 | Oberhuler | 428/178 |
| 4,428,151 | 1/1984 | Solomon | 47/81 |

FOREIGN PATENT DOCUMENTS 109632  8/1966  Norway ...................... 47/81

Primary Examiner—Robert A. Hafer
Assistant Examiner—Kevin G. Rooney
Attorney, Agent, or Firm—Darby & Darby

[57] ABSTRACT

A combined capillary mat and platform formed of a bottom piece of material having individual air cells which rest on a base to provide a platform and a sheet of mat material attached to the top of the first piece for providing capillary action. The combined mat and platform are preferably made by melting particles or granules of material on a surface of the mat which is thereafter bonded under pressure to the top surface of the bottom piece.

11 Claims, 2 Drawing Sheets

COMBINED PLATFORM AND CAPILLARY MAT FOR PLANT TENDER DEVICE AND METHOD OF MANUFACTURE

This is a continuation of application Ser. No. 693,100 filed Jan. 22, 1985.

In prior U.S. Pat. No. 4,276,720 granted July 7, 1981, which is assigned to the assignee of the subject application, a system is disclosed for plant watering and tending. The system includes a tray having a platform of rigid material on which a capillary mat is placed. The mat has an end which comes into contact with water in a reservoir in the tray. The plants are placed on top of the mat and are provided with water directly into the plant bottom. The mat also evaporates water to the plant leaves.

The present invention is directed to an improvement over the system of the aforesaid patent. In accordance with the invention, a capillary mat and the platform for supporting it and, for example, objects such as the plant pots, are made as an integral unit. The combination platform and capillary mat is formed by a sheet of "bubble" type packaging material onto which is laminated a mat of material which is capable of providing capillary action. The complete combination platform and mat unit can be made on a mass production basis in large sheets which can be thereafter cut into sizes corresponding to a size for a tray and laid down directly into the tray. In this way, an efficient plant tender system is made in a relatively inexpensive manner. The invention is also directed to a method of making the integral unit using particles of plastic or adhesive to bond together continuous sheets of the bubble pack and mat materials.

It is therefore an object of the present invention to provide a system for holding plant pots and for watering the plants.

A further object is to provide a plant tending system utilizing a capillary mat in which the mat also provides water from its entire surface area to thereby give off water vapor to the leaves of the plants.

An additional object is to provide an inexpensive platform-capillary mat.

A further object is to provide a novel integral capillary mat and platform and a method of making it.

An additional object is to provide a novel capillary mat and platform for a plant tender device in which the platform is formed by bubble type material.

Object objects and advantages of the present invention will become more apparent upon reference to the following specification and annexed drawings in which.

Figure 1:
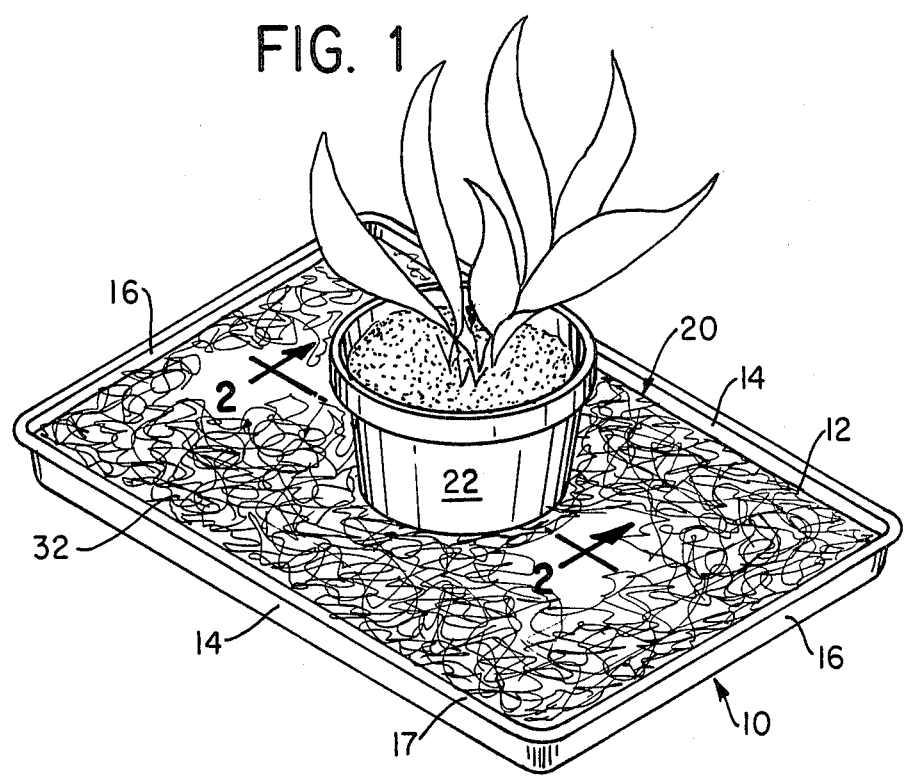
FIG. 1 is a perspective view of the tray and combined capillary mat platform showing a plant pot in place.

Referring to the drawings, there is shown in FIG. 1 a tray 10 having a usual recessed central area 12 with upstanding side walls 14 and end walls 16. The tray has a peripheral lip portion 17, although this is not absolutely necessary, and a bottom 19. The tray can be made of any suitable material such as plastic, metal or rubber which is capable of holding water. It also can be of any desired dimension and the recess 12 of any desired depth.

The mat platform unit 20, described in detail below, is located in the central recessed area 12 of the tray. Shown located on top of the mat platform 20 are one or more plant pots 22. Each pot usually has a hole in the bottom thereof to provide communication with the capillary mat. The soil in the plant is watered by the water entering the pot through the hole and/or migrating through the pot wall, which is usually porous. The wet mat also humidifies the air around the leaves of the plant.

Figure 2:
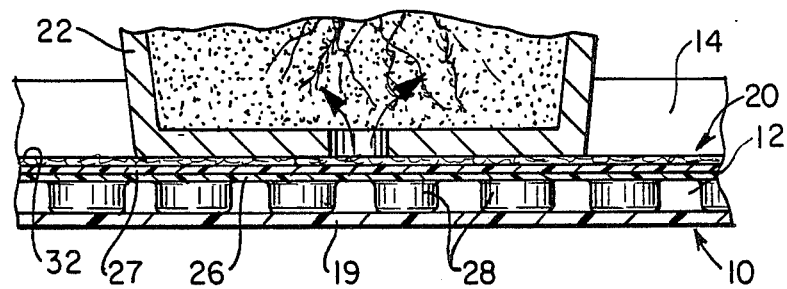
FIG. 2 is a cross-sectional view of the mat platform unit.
Figure 3:
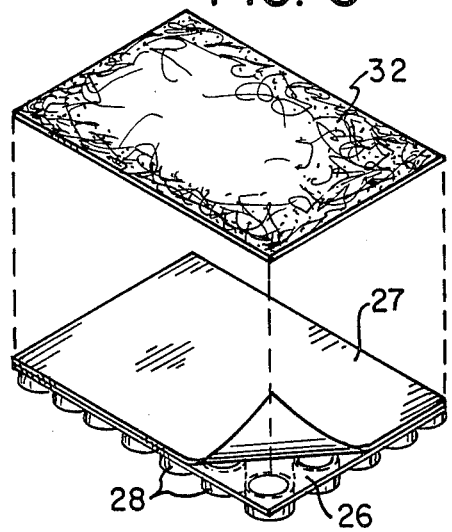
FIG. 3 is an exploded perspective view of the combined capillary mat and platform.
Figure 4:
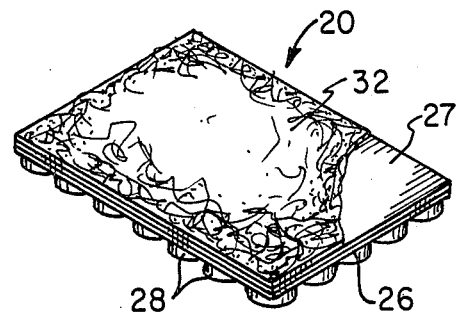
FIG. 4 is a perspective view of the combined capillary mat and platform.

FIGS. 2-4 show the details of the mat platform 20. It includes a lower portion 26 of so-called bubble pack material. The bubble material is essentially two sheets of a suitable plastic material, such as polyethylene, which are laminated together. The top sheet 27 is a continuous web which is substantially flat. The bottom sheet 28 includes a number of air pockets, or cells, or bubbles. The bubbles are preferably made in an ordered pattern of rows and columns, with one row of bubbles being offset from the next by a given distance, for example, half the diameter of a bubble. The precise arrangement of the bubbles is not critical.

It is preferred that the bubbles have a reasonably large diameter, for example, one-half inch or more, since this provides greater load bearing capability. However, smaller size bubbles can be used, but more of them would be needed. If the diameter is about one-half inch, the spacing between adjacent bubbles is about 3/16 inch. This also is not critical. Also, the bubbles can be of any shape—round, square, rectangular, etc. It is sufficient to say that the size and number of bubbles determines the load bearing capacity of the mat platform.

Sheets 27 and 28 are sealed together in an airtight manner and the bubbles have air therein to somewhat less than their capacity so that they will deform to a flattened condition but not break, even if a substantial amount of force is applied thereto from the top. Such bubble pack material is of relatively conventional construction and is often used in packaging of various products for purposes of preventing breakage.

Laminated to the top sheet 27 of the bubble material is the capillary mat 32. The capillary mat is a sheet of a non-woven material, for example, a combination of polyester-rayon, e.g. 50-50 polyester-rayon. The polyester can be, for example, from the groups of material used for low cost interfacing for fabrics and clothing. The non-woven material provides a finish which can withstand the wear of the pots. It is preferred that the color be gray or black so that dirt will not show. Any other color may be used.

The mat 32 is adhered to the top piece 27 of the bubble material by a suitable adhesive or other bonding material. A preferred adhesion process is described below.

Figure 5A:
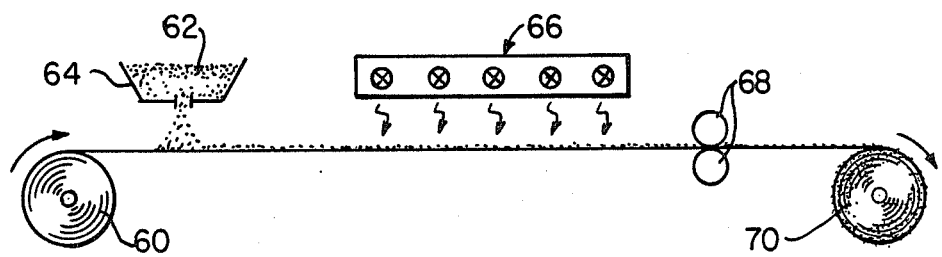
FIGS. 5A and 5B are schematic diagrams showing the method of manufacture.
Figure 5B:
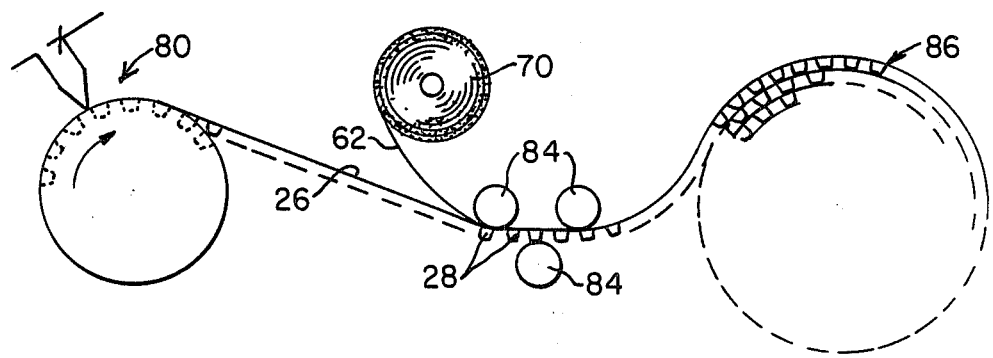

Referring to FIGS. 5A and 5B, the manufacturing process for the mat platform 20 is preferably carried out as follows. To form the capillary mat 32, a roll 60 of the non-woven material is provided. After the web of material is unwound from the roll 60, particles or granules 62 of plastic, such as polyethylene, are dispensed over one surface as uniformly as possible from a dispenser 64. The web then passes under a heater 66, which can be of the gas or infrared type, where the particles 62 are softened and melted and then through a pair of rollers 68 which press the melted particles flat. The web is then wound onto a roll 70.

To complete the process, the bubble pack material is provided already finished on a continuous basis with the two pieces 27, 28 laminated together. In production, the bubble pack material comes off of an extruder 80 on a continuous basis. The web of the roll 70 of mt material 32 is unrolled over the flat continuous sheet 27 of the bubble material and passed through a set of rollers 84 where the adhesive particles are bonded by pressure to such flat sheet. The complete product is wound onto a roll 86 from which it may be dispensed and cut into the proper size pieces.

As shown in FIGS. 1 and 2, the mat 20 is laid down in the tray 10. The tray is filled with water, preferably to a level below the top layer 27 of the bubble material. An end of the mat 32 is bent down into the water. A small area of contact or immersion of mat 32 into the water is enough to start and maintain the capillary action for the entire mat. Any pot placed on the mat 32 receives water at its bottom. If the bottom of the pot has a hole, the water is passed to the plant soil, also by capillary action. In addition, water is evaporated from the mat to the leaves of the plants.

Referring back again to FIG. 1, it should be noted that when the mat platform 20 is placed in the tray 10, that the bubbles serve as a stable platform since they have a large number of areas which are spaced in a more or less symmetrical manner, which provide a firm support. The support areas increase as the load on the mat increases and the bubbles become flatter.

In operation, the tray is filled with water up to the level of the mat so that the capillary action can take place. Thereafter, the water goes through the mat and wets it. The capillary action wets the entire mat and the water reaches the plant soil through the hole in the plant or through the pot itself. Also, water is evaporated from the entire top surface up to the leaves of the plant to provide the necessary water vapor environment for the plant leaves.

What is claimed is:

1. A plant tender system comprising a tray having a bottom and side walls for holding a liquid;

an integral mat platform unit for disposition in said tray, said mat platform formed by a first piece of flexible, liquid non-permeable material having a plurality of spaced projecting air cells on its bottom for resting directly on the tray bottom, and a second piece of flexible material having capillary action when wetted by liquid in the tray bonded to the top of said first piece above said air cells and generally coextensive with said first piece to form an integral mat platform unit, said air cells of said first piece of material resting directly on the bottom of said tray and forming a support for at least one free standing weighted object placed on the top of said second piece, liquid being stored in the tray including in the space between said air cells, said second piece receiving the liquid in the tray which is distributed throughout said second piece by capillary action to supply the liquid to a said object as it is supported above the tray bottom.

2. A plant tender as in claim 1 wherein said second piece is made of a non-woven material.

3. A plant tender as in claim 2 wherein said non-woven material is a combination of rayon and polyester.

4. A plant tender as in claim 1 wherein said second piece has particulate or granular plastic material adhered thereto which bonds said second piece to said first piece.

5. A plant tender as in claim 4 wherein said non-woven material is a combination of rayon and polyester.

6. A plant tender as in claim 5 wherein said particles or granular material are of polyethylene.

7. An integral combined capillary mat and platform for a plant tender system comprising a bottom piece of flexible, liquid non-permeable material formed with a plurality of spaced, projecting air cells which are adapted to rest directly on a surface and provide reservoir areas containing liquid in the spaces between said air cells, and a top piece of flexible capillary material adhered to the surface of said bottom piece opposite the surface from which said air cells extend and generally coextensive therewith to form a substantially flat area, said air cells of said bottom piece beneath said flat area of said top piece when resting on said surface also forming a support for at least one free standing weighted object placed on the top surface of said top piece in the flat area which supplies liquid throughout said top piece by capillary action.

8. A combined capillary mat and platform as in claim 7 wherein said top piece has a plurality of particles or granules adhered to its bottom surface for adhering said top piece to said bottom piece.

9. A combined capillary mat and platform as in claim 7 wherein said top piece is made of a non-woven material.

10. A combined capillary mat as in claim 7 wherein said non-woven material is a combination of rayon and polyester or other non-woven fiber.

11. A combined capillary mat as in claim 8 wherein said top piece has a plurality of particles or granules of polyethelene adhered to its bottom surface for bonding said top piece to said bottom piece.

* * * * *